(12) United States Patent
Dange et al.

(10) Patent No.: US 9,018,787 B2
(45) Date of Patent: Apr. 28, 2015

(54) SYSTEM AND METHOD OF WIND TURBINE CONTROL USING A TORQUE SETPOINT

(75) Inventors: Devendra Shashikant Dange, Atlanta, GA (US); Thomas Frank Fric, Greer, SC (US); Edward Wayne Hardwicke, Jr., Simpsonville, SC (US); Renjith Viripullan Kekkaroth, Bangalore (IN); Noah Pennington, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 460 days.

(21) Appl. No.: 13/454,529

(22) Filed: Apr. 24, 2012

(65) Prior Publication Data

US 2013/0277970 A1    Oct. 24, 2013

(51) Int. Cl.
*H02P 9/00* (2006.01)
*F03D 7/02* (2006.01)

(52) U.S. Cl.
CPC .............. *F03D 7/026* (2013.01); *F03D 7/0276* (2013.01); *F05B 2270/335* (2013.01); *Y02E 10/723* (2013.01)

(58) Field of Classification Search
USPC .................................................. 290/44, 55
See application file for complete search history.

(56) References Cited

U.S. PATENT DOCUMENTS

| | | | |
|---|---|---|---|
| 3,665,274 A | 5/1972 | Born et al. | |
| 4,703,189 A | 10/1987 | DiValentin et al. | |
| 5,289,041 A | 2/1994 | Holley | |
| 6,600,240 B2 | 7/2003 | Mikhail et al. | |
| 6,619,918 B1 | 9/2003 | Rebsdorf | |
| 6,703,718 B2 | 3/2004 | Calley et al. | |
| 6,840,734 B2 | 1/2005 | Hansen | |
| 6,847,128 B2 | 1/2005 | Mikhail et al. | |
| 7,015,595 B2 | 3/2006 | Feddersen et al. | |
| 7,023,105 B2 | 4/2006 | Wobben | |
| 7,411,309 B2 | 8/2008 | Hudson | |
| 7,476,987 B2 | 1/2009 | Chang | |
| 7,880,320 B2 * | 2/2011 | Cook | 290/44 |
| 8,022,565 B2 | 9/2011 | Scholte-Wassink et al. | |
| 8,093,737 B2 | 1/2012 | Wittekind et al. | |
| 2004/0108732 A1 | 6/2004 | Weitkamp | |
| 2005/0046375 A1 | 3/2005 | Maslov et al. | |
| 2006/0112688 A1 | 6/2006 | Vos et al. | |
| 2006/0273595 A1 | 12/2006 | Avagliano et al. | |
| 2007/0018457 A1 | 1/2007 | Llorent Gonzalez | |
| 2007/0278797 A1 | 12/2007 | Flannery et al. | |
| 2008/0084068 A1 | 4/2008 | Shibata et al. | |
| 2009/0008937 A1 | 1/2009 | Erdman et al. | |

(Continued)

FOREIGN PATENT DOCUMENTS

EP        1939445 A2    7/2008

*Primary Examiner* — Tho D Ta
(74) *Attorney, Agent, or Firm* — Dority & Manning, P.A.

(57) ABSTRACT

In one aspect, embodiments of a method of controlling a power rating of a wind turbine are described. One embodiment of the method comprises retrieving, by a computing device, one or more preset values from a memory, wherein the one or more preset values include at least an initial torque setpoint for a wind turbine; determining, by the computing device, an adjusted torque setpoint for the wind turbine based at least in part on one or more operating conditions received from one or more measurement devices associated with the wind turbine; and adjusting a real power output rating of the wind turbine based on the determined adjusted torque setpoint. In one aspect, the computing device can be a controller for the wind turbine.

22 Claims, 7 Drawing Sheets

(56) References Cited

U.S. PATENT DOCUMENTS

| | | |
|---|---|---|
| 2009/0079193 A1 | 3/2009 | Nielsen et al. |
| 2009/0083019 A1 | 3/2009 | Nasle |
| 2009/0174186 A1 | 7/2009 | Nyborg |
| 2010/0072751 A1 | 3/2010 | Andersen et al. |
| 2010/0135789 A1 | 6/2010 | Zheng et al. |
| 2010/0138182 A1 | 6/2010 | Jammu et al. |
| 2010/0268395 A1 | 10/2010 | Ingemann et al. |
| 2010/0271994 A1 | 10/2010 | Wolfe |
| 2011/0006603 A1 | 1/2011 | Robinson et al. |
| 2011/0064573 A1* | 3/2011 | Viripullan et al. ............... 416/1 |
| 2012/0066604 A1* | 3/2012 | Vasudevarao et al. ........ 715/735 |

\* cited by examiner

SYSTEM AND METHOD OF WIND TURBINE CONTROL USING A TORQUE SETPOINT

BACKGROUND OF THE INVENTION

The subject matter described herein relates generally to wind turbines and, more particularly, to a method and system for controlling a wind turbine and increasing the amount of energy capture.

Generally, a wind turbine includes a turbine that has a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a base that may be a truss or tubular tower.

Some wind turbine configurations include double-fed induction generators (DFIGs). Such configurations may also include power converters that are used to convert a frequency of generated electric power to a frequency substantially similar to a utility grid frequency. Moreover, such converters, in conjunction with the DFIG, also transmit electric power between the utility grid and the generator as well as transmit generator excitation power to a wound generator rotor from one of the connections to the electric utility grid connection. Alternatively, some wind turbine configurations include, but are not limited to, alternative types of induction generators, permanent magnet (PM) synchronous generators and electrically-excited synchronous generators and switched reluctance generators. These alternative configurations may also include power converters that are used to convert the frequencies as described above and transmit electrical power between the utility grid and the generator.

Known wind turbines have a plurality of mechanical and electrical components. Each electrical and/or mechanical component may have independent or different operating limitations, such as current, voltage, power, and/or temperature limits, than other components. Moreover, known wind turbines typically are designed and/or assembled with pre-defined rated power limits. To operate within such rated power limits, the electrical and/or mechanical components may be operated with large margins for the operating limitations. In some instances, operating limitations are established for average operating conditions and not determined by real-time measurement of operating conditions. Such operation may result in inefficient wind turbine operation, and a power generation capability of the wind turbine may be underutilized. For example, in some combinations of operating conditions, operating limitations can be greater than those allowed based on average operating conditions without any loss in safety margins. Simply put, the machine may produce more power at favorable operating conditions when such operating conditions are monitored and measured in real-time or near real-time without increasing the risk of damaging the machine.

Therefore, what are desired are methods and systems that overcome challenges in the art, some of which are described above.

BRIEF DESCRIPTION OF THE INVENTION

Described herein are embodiments of methods and systems to control a wind turbine based on torque settings determined from one or more measured operating conditions.

In one aspect, embodiments of a method of controlling a power rating of a wind turbine are described. One embodiment of the method comprises retrieving, by a computing device, one or more preset values from a memory, wherein the one or more preset values include at least an initial torque setpoint for a wind turbine; determining, by the computing device, an adjusted torque setpoint for the wind turbine based at least in part on one or more operating conditions received from one or more measurement devices associated with the wind turbine; and adjusting a real power output rating of the wind turbine based on the determined adjusted torque setpoint.

In another aspect, embodiments of systems for controlling a wind turbine are described. One embodiment comprises one or more measurement devices, wherein the one or more measurement devices are configured to measure one or more operating conditions of a wind turbine; a controller; and a memory associated with the controller, wherein the controller is configured to: receive the one or more measured operating conditions from the one or more measurement devices; retrieve one or more preset values from the memory wherein said one or more preset values includes an initial torque setpoint for the wind turbine; determine an adjusted torque setpoint for the wind turbine based at least in part on one or more operating conditions received from one or more measurement devices associated with the wind turbine; and adjust a real power output rating in the controller for the wind turbine based on the determined adjusted torque setpoint.

In yet another aspect, embodiments of another system for controlling a wind turbine are described. One embodiment comprises one or more measurement devices, wherein the one or more measurement devices are configured to measure at least a system grid voltage, one or more grid currents, one or more grid phase angles, and an ambient temperature; a controller; and a memory associated with the controller, wherein the controller is configured to: receive the system grid voltage, one or more grid currents, one or more grid phase angles, and ambient temperature from the one or more measurement devices; calculate a system power factor from the received system grid voltage, one or more grid currents, one or more grid phase angles; retrieve an initial torque setpoint, altitude of the wind turbine and a turbulence intensity from the memory; determine an adjusted torque setpoint for the wind turbine based on the system grid voltage, the system power factor, ambient temperature, altitude of the wind turbine, and the turbulence intensity; replace the initial torque setpoint in the controller for the wind turbine with the determined adjusted torque setpoint; and uprate or derate a power rating of the wind turbine based on the determined adjusted torque setpoint.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

Wherever possible, the same reference numbers will be used throughout the drawings to represent the same parts.

DETAILED DESCRIPTION OF THE INVENTION

Before the present methods and systems are disclosed and described, it is to be understood that the methods and systems are not limited to specific synthetic methods, specific components, or to particular compositions. It is also to be understood that the terminology used herein is for describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

Figure 1:
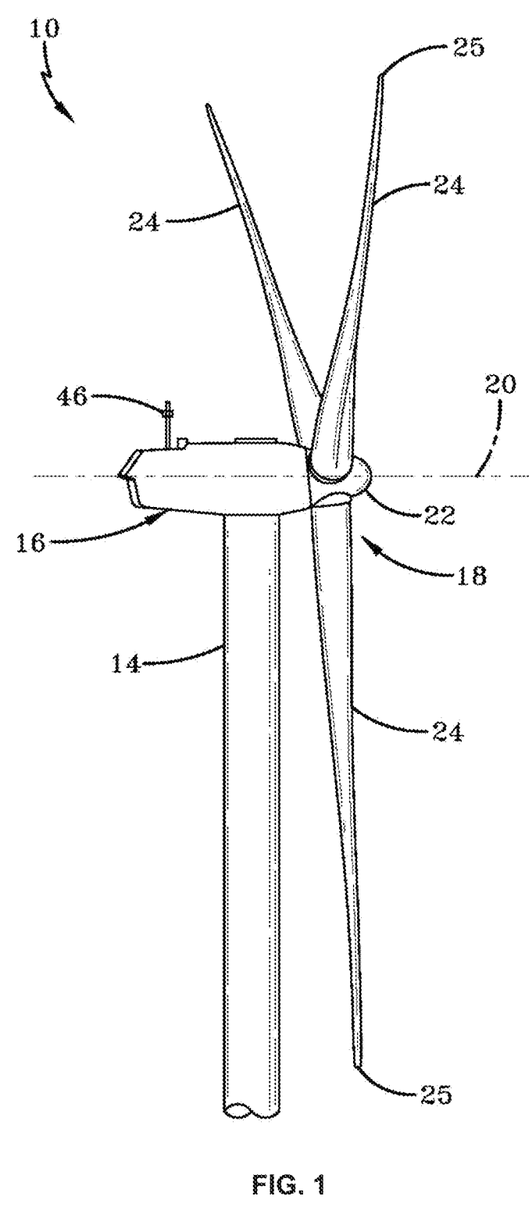
FIG. 1 is a perspective view of an exemplary embodiment of a wind turbine in accordance with the present disclosure.
Figure 2:
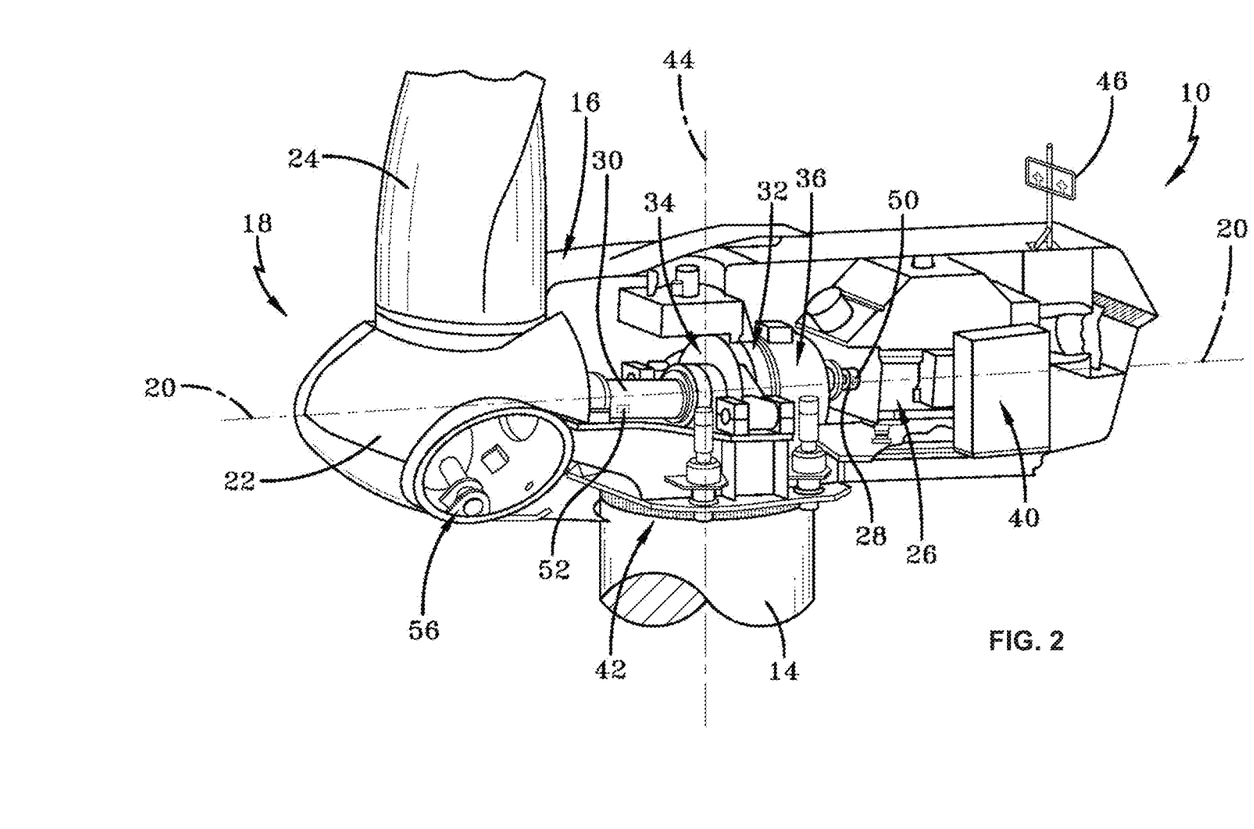
FIG. 2 is a partially cut-away perspective view of a portion of the wind turbine shown in FIG. 1 in accordance with the present disclosure.
Figure 3:
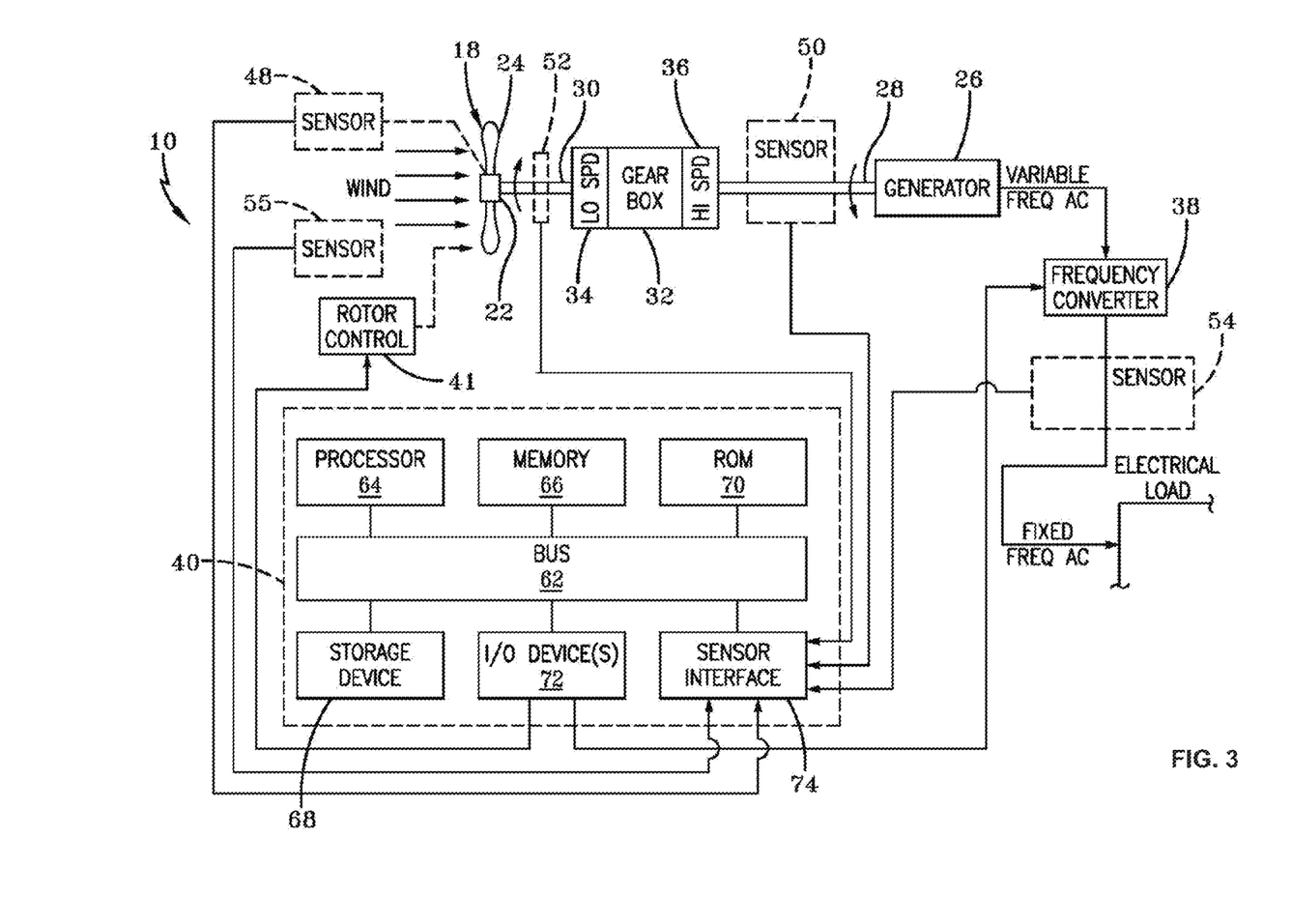
FIG. 3 is a schematic diagram of a wind turbine in accordance with the present disclosure.

FIG. 1 is a perspective view of an exemplary wind turbine generator 10 in accordance with an embodiment of the present disclosure. FIG. 2 is a partially cut-away perspective view of a portion of an exemplary wind turbine generator 10 in accordance with an embodiment of the present disclosure. FIG. 3 is a schematic diagram of an exemplary wind turbine 10. According to embodiments of the present disclosure, torque-based control of the power output of a wind turbine generator can be performed. For example, one or more measurement devices such as sensors, anemometers, and the like that are associated with one or more wind turbines are used to measure operating conditions such as, for example, a system grid voltage, one or more grid currents, phase angles of the voltage and currents, ambient temperature, and the like. A computing device, such as a controller, that is associated with the one or more wind turbines receives the measured operating condition information, calculates a system power factor from the received system voltage, currents and phase angles, and determines an adjusted torque setpoint for the wind turbine based on the measured operating conditions. The calculation of the adjusted torque setpoint may also take into consideration preset parameters such as the initial torque setpoint, altitude of a wind turbine, turbulence intensity, and the like. The torque rating in the computing device for the wind turbine is set based on the determined adjusted torque setpoint. The total power delivered from a generator to the grid is given by the equation $P_{gen}=T^*\omega_m$, where T=airgap torque of the generator and $\omega_m$ is the rotor mechanical speed. Because the real power output of a wind turbine is proportional to the torque, the real power output rating of the wind turbine can be uprated (greater output real power) or derated (less output real power) based on the set torque rating.

The exemplary wind turbine 10 (herein, wind turbine and wind turbine generator shall be used interchangeably) described and illustrated herein is a wind generator for generating electrical power from wind energy. However, in some embodiments, wind turbine 10 may be, in addition or alternative to a wind generator, any type of wind turbine, such as, but not limited to, a windmill (not shown). Moreover, the exemplary wind turbine 10 described and illustrated herein includes a horizontal-axis configuration. However, in some embodiments, wind turbine 10 may include, in addition or alternative to the horizontal-axis configuration, a vertical-axis configuration (not shown). Wind turbine 10 may be coupled to an electrical load (not shown), such as, but not limited to, a power grid (not shown) for receiving electrical power therefrom to drive operation of wind turbine 10 and/or its associated components and/or for supplying electrical power generated by wind turbine 10 thereto. Although only one wind turbine 10 is shown in FIGS. 1-3, in some embodiments a plurality of wind turbines 10 may be grouped together, sometimes referred to as a "wind farm" or "wind park."

The exemplary wind turbine 10 includes a body 16, sometimes referred to as a "nacelle", and a rotor (generally designated by 18) coupled to body 16 for rotation with respect to body 16 about an axis of rotation 20. In the exemplary embodiment, nacelle 16 is mounted on a tower 14. The height of tower 14 may be any suitable height enabling wind turbine 10 to function as described herein. Rotor 18 includes a hub 22 and a plurality of blades 24 (sometimes referred to as "airfoils") extending radially outward from hub 22 for converting wind energy into rotational energy. Each blade 24 has a tip 25 positioned at the end thereof, which is distant from the hub 22. Although rotor 18 is described and illustrated herein as having three blades 24, rotor 18 may have any number of blades 24. Blades 24 may each have any length (whether or not described herein).

Despite how rotor blades 24 are illustrated in FIG. 1, rotor 18 may have blades 24 of any shape, and may have blades 24 of any type and/or any configuration, whether or not such shape, type, and/or configuration is described and/or illustrated herein. Another example of a type, shape, and/or configuration of rotor blades 24 is a Darrieus wind turbine, sometimes referred to as an "eggbeater" turbine. Yet another example of a type, shape, and/or configuration of rotor blades 24 is a Savonious wind turbine. Even another example of another type, shape, and/or configuration of rotor blades 24 is a traditional windmill for pumping water, such as, but not limited to, four-bladed rotors having wooden shutters and/or fabric sails. Moreover, the exemplary wind turbine 10 may, in some embodiments, be a wind turbine wherein rotor 18 generally faces upwind to harness wind energy, and/or may be a wind turbine wherein rotor 18 generally faces downwind to harness energy. Of course, in any embodiments, rotor 18 may not face exactly upwind and/or downwind, but may face generally at any angle (which may be variable) with respect to a direction of the wind to harness energy therefrom.

Referring now to FIGS. 2 and 3, the exemplary wind turbine 10 includes an electrical generator 26 coupled to rotor 18 for generating electrical power from the rotational energy generated by rotor 18. Generator 26 may be any suitable type of electrical generator, such as, but not limited to, a wound rotor induction generator. Generator 26 includes a stator (not shown) and a rotor (not shown). Wind turbine rotor 18 includes a rotor shaft 30 coupled to rotor hub 22 for rotation therewith. Generator 26 is coupled to rotor shaft 30 such that rotation of rotor shaft 30 drives rotation of the generator rotor, and therefore operation of generator 26. In the exemplary embodiment, the generator rotor has a rotor shaft 28 coupled thereto and coupled to rotor shaft 30 such that rotation of rotor shaft 30 drives rotation of the generator rotor. In other embodiments, the generator rotor is directly coupled to rotor shaft 30, sometimes referred to as a "direct-drive wind turbine." In the exemplary embodiment, generator rotor shaft 28 is coupled to rotor shaft 28 through a gearbox 32, although in other embodiments the generator rotor shaft 28 is coupled directly to rotor shaft 30. More specifically, in the exemplary embodiment, gearbox 32 has a low speed side 34 coupled to rotor shaft 30 and a high speed side 36 coupled to generator rotor shaft 28. The torque of rotor 18 drives the generator rotor to thereby generate variable frequency AC electrical power from rotation of rotor 18. Generator 26 has an air gap torque between the generator rotor and stator that opposes the torque of rotor 18. A frequency converter 38 is coupled to generator 26 for converting the variable frequency AC to a fixed frequency AC for delivery to an electrical load (not shown), such as, but not limited to, a power grid (not shown), coupled to generator 26. Frequency converter 38 may be located anywhere within or remote to wind turbine 10. For example, in the exemplary embodiment, frequency converter 38 is located within a base (not shown) of tower 14.

In one aspect, exemplary wind turbine 10 includes one or more control systems embodied in a turbine control unit (TCU) or controller (herein, TCU and controller shall be used interchangeably) 40 coupled to some or all of the components of wind turbine 10 for generally controlling operation of wind turbine 10 and/or some or all of the components thereof (whether or not such components are described and/or illustrated herein). In one aspect, the TCU 40 may be used for, but is not limited to, power generation monitoring and control including, for example, pitch and speed regulation, high-speed shaft and yaw brake application, yaw and pump motor application, fault monitoring, speed monitoring and control, generator control include real and reactive power settings, torque settings, ambient temperature monitoring, altitude and barometric pressure monitoring, grid condition (e.g., voltage, current, phase angles), and the like. In one aspect, the initial torque setpoint, altitude of a wind turbine and other parameters such as turbulence intensity may be preset parameters that can be stored in a memory associated with the TCU 40, as such memory is described herein, or in a memory associated with a computing device connected with the TCU 40, as such computing device may be described herein. Alternative distributed or centralized control architectures may be used in some embodiments.

In some embodiments, wind turbine 10 may include a disc brake (not shown) for braking rotation of rotor 18 to, for example, slow rotation of rotor 18, brake rotor 18 against full wind torque, and/or reduce the generation of electrical power from electrical generator 26. Furthermore, in some embodiments, wind turbine 10 may include a yaw system 42 for rotating nacelle 16 about an axis of rotation 44, for changing a yaw of rotor 18, and more specifically for changing a direction faced by rotor 18 to, for example, adjust an angle between the direction faced by rotor 18 and a direction of wind. In one aspect, the yaw system 42 may be coupled to the TCU 40 for control thereby. In some embodiments, wind turbine 10 may include anemometry 46 for measuring wind speed and/or wind direction. Anemometry 46, in some embodiments, may be coupled to the TCU 40 for sending measurements to control system(s) for processing thereof. For example, although anemometry 46 may be coupled to the TCU 40 for sending measurements thereto for controlling other operations of wind turbine 10, anemometry 46 may send measurements to the TCU 40 for controlling and/or changing a yaw of rotor 18 using yaw system 42. Alternatively, anemometry 46 may be coupled directly to yaw system 42 for controlling and/or changing a yaw of rotor 18.

In one aspect, the exemplary wind turbine 10 may also include a plurality of sensors or measurement devices 48, 50, 52, 54, 55 (FIG. 3), for measuring an angle of each blade 24 with respect to a wind direction and/or with respect to rotor hub 22, for measuring a speed of rotation of rotor shaft 28 and/or a torque of generator rotor shaft 28, for measuring a speed of rotation of generator shaft 28 and/or a torque of rotor shaft 30, for measuring an electrical power output of generator 26, for sending measurements to control system(s) for processing, and for measuring parameters of component(s) such as sensors configured to measure displacements, yaw, pitch, movements, strain, stress, twist, damage, failure, rotor torque, rotor speed, an anomaly in the electrical load, and/or an anomaly of power supplied to any component of wind turbine 10, and the like. Such other sensors may couple to any component of wind turbine 10 and/or the electrical load at any location thereof for measuring any parameter thereof, whether or not such component, location, and/or parameter is described and/or illustrated herein.

Referring again to FIG. 3, in some embodiments, the TCU 40 can include a bus 62 or other communications device to communicate information. One or more processor(s) 64 can be coupled to bus 62 to process information, including information from anemometry 46, sensors 48, 50, 52, 54 and/or 55, and/or other sensor(s). The TCU 40 may also include one or more random access memories (RAM) 66 and/or other storage device(s) 68. RAM(s) 66 and storage device(s) 68 are coupled to bus 62 to store and transfer information and instructions to be executed by processor(s) 64. RAM(s) 66 (and/or also storage device(s) 68, if included) can also be used to store temporary variables or other intermediate information during execution of instructions by processor(s) 64. The TCU 40 may also include one or more read only memories (ROM) 70 and/or other static storage devices coupled to bus 62 to store and provide static (i.e., non-changing) information and instructions to processor(s) 64. Input/output device(s) 72 may include any device known in the art to provide input data to control system(s) and/or to provide outputs, such as, but not limited to, yaw control and/or pitch control outputs. Furthermore, in one aspect the TCU 40 interfaces with a supervisory control and data acquisition (SCADA) system (not shown) through the input/output device 72. The SCADA system can be used to collect and monitor data from the wind turbine 10 as well as to provide control commands to the TCU 40. Instructions may be provided to memory from a storage device, such as, but not limited to, a magnetic disk, a read-only memory (ROM) integrated circuit, CD-ROM, and/or DVD, via a remote connection that is either wired or wireless, providing access to one or more electronically-accessible media, etc. In some embodiments, hard-wired circuitry can be used in place of or in combination with software instructions. Thus, execution of sequences of instructions is not limited to any specific combination of hardware circuitry and software instructions, whether described and/or illustrated herein. In one aspect, the TCU 40 may also include a sensor interface 74 that allows control system(s) 40 to communicate with anemometry 46, sensors 48, 50, 52, 54 and/or 55, and/or other sensor(s). Sensor interface 74 can be or can include, for example, one or more analog-to-digital converters that convert analog signals into digital signals that can be used by processor(s) 64.

As noted above, in one aspect the TCU 40 can operate in conjunction with a supervisory control and data acquisition (SCADA) system to dynamically monitor and control wind turbine(s) 10 or wind farm(s). The SCADA system can include a Human-Machine Interface (HMI), a supervisory (computer) system, Remote Terminal Units (RTUs), and a communication infrastructure. The HMI is an apparatus that presents performance-related information to the operator. By using the HMI, the operator can monitor and/or control operation of wind turbine(s) 10 and/or wind farm(s). In one aspect, the HMI includes a graphical user interface (GUI) that allows the operator to interface with the wind farm in a graphical manner. The supervisory system monitors wind turbine(s) 10 and/or wind farm(s) by gathering and/or acquiring information (in the form of data). Also, the supervisory system controls wind turbine(s) 10 and/or wind farm(s) by transmitting commands to wind turbine(s) 10 and/or wind farm(s). The RTUs receive signals from anemometry 46, sensors 48, 50, 52, 54 and/or 55, and/or other sensor(s), convert the signals into digital data, and transmit the digital data to the supervisory system via the communication infrastructure (for example, optical fibers). In one aspect, the TCU 40 comprises an RTU. In one aspect, in addition to the wind turbines 10, the wind farm can comprise one or more substation and/or meteorological stations, each having separate RTUs.

The SCADA system acts as a "nerve center" for wind turbine(s) 10 and/or wind farm(s). The SCADA system continuously analyzes the performance-related information and transmits signals to the GUI so that the performance-related information can be visually depicted in a dynamic manner. The SCADA system can monitor and/or control wind turbine(s) 10 and wind farm(s), one or more substations (not shown), and one or more meteorological stations (not shown) thus allowing the operator to cohesively monitor and/or control wind turbine(s) 10 at a specific location, a wind farm, or any other suitable grouping of wind turbines 10. The SCADA system stores periodic records throughout a given period of time. The periodic records can be based upon activity at the specific location, the wind farm, or any other suitable grouping of wind turbines 10. The periodic records can be analyzed to provide the operator with performance-related information. The performance-related information can be used for implementing corrective action. The SCADA system implements requirements based upon connection agreements to control reactive power production, to contribute to network voltage or frequency control, or to limit power output in response to instructions from a network operator.

Figure 4:
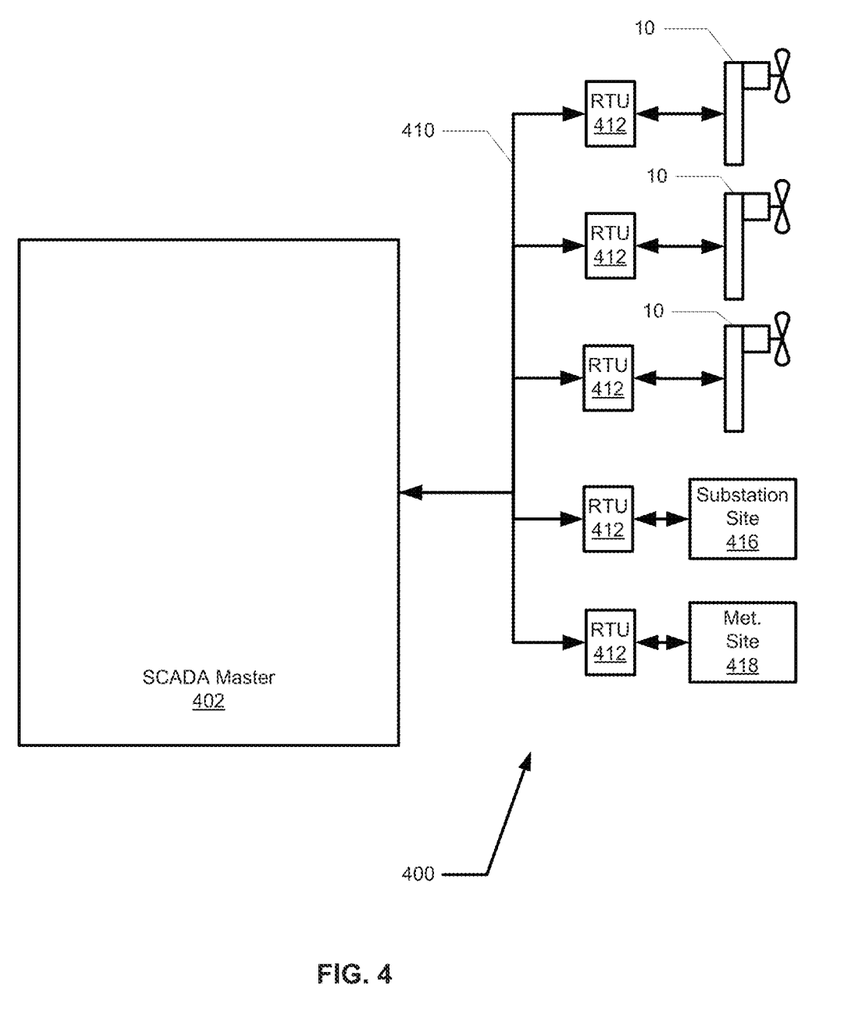
FIG. 4 is an overview block diagram of an embodiment of a wind farm system as described herein.

FIG. 4 provides an overview block diagram of an embodiment of a wind farm system as described above. A computing device 402 that can be used as a SCADA-master is described. The SCADA-master 402 communicates over a network 410 with various remote terminal units (RTUs) 412. The network 410 can be wired (including fiber optic or other non-conductive mediums), wireless or a combination thereof as known to one of ordinary skill in the art. In one aspect, the RTUs 412 can comprise turbine control units (TCUs), substation control units (SCUs), meteorological control units (MCUs), and the like. Further comprising the system of FIG. 4 are one or more wind turbines 10, one or more substations 416 and one or more meteorological stations 418.

As shown in FIG. 4, a computing device such as SCADA-master 402 receives supervisory control and data acquisition (SCADA) data for a wind farm 400 over the network 410 or retrieves stored data from a memory. In one aspect, the wind farm 400 is comprised of one or more wind turbines 10. In one aspect, the wind farm 400 is further comprised of one or more meteorological sites 418 and one or more substation sites 416. SCADA data includes parameters for the wind farm including control and operational parameters for the one or more wind turbines 10. In one aspect, the wind farm parameters include historical data and real-time data points. Real-time data points are tags that can be updated into the SCADA system every second or other near real-time time period from the wind farm (e.g., wind turbines, substation, meteorological controller, output of other rules, etc.). Examples of real-time data points for a wind farm 400 include, for example, wind speed, turbine power (turbines), wind direction (meteorological), KVarh import/export (substation), site power (output of aggregation rule), system grid voltage, system power factor, ambient temperature, and the like. Historical data can include, for example, current month power production, current year down time, power production till date since commissioning, average generator temperature since last 10 min, average power production since last week, and the like. All of these points, historical and real-time, can be configured using the SCADA-master 402. Stored data can include, for example, preset values such as an initial torque setpoint, altitude of the wind turbine, turbulence intensity, and the like.

Figure 5:
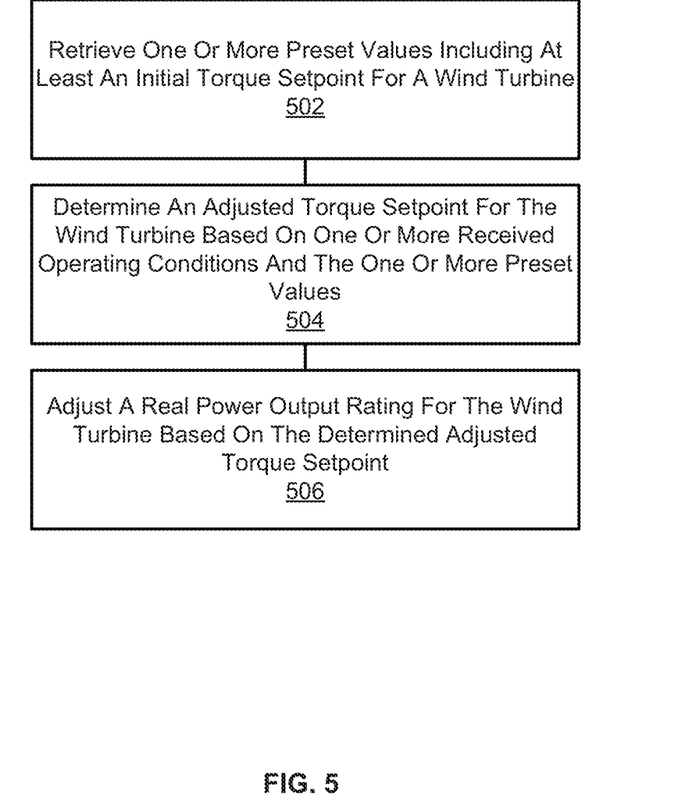
FIG. 5 is a flowchart that illustrates an embodiment of a method of controlling a power rating of a wind turbine.

In one aspect, the SCADA master 402, TCU 40, or other computing device can be used to implement a method of controlling a wind turbine 10. For example, as shown in the exemplary flow chart of FIG. 5, at step 502 in one aspect, one or more preset values can be retrieved by the TCU 40, SCADA master 402, or other computing device from a memory. In one aspect, the one or more preset values include an initial torque setpoint for a wind turbine. In other aspects, the one or more preset values can include altitude of the wind turbine, turbulence intensity, and the like. At step 504, an adjusted torque setpoint for the wind turbine can be determined by the TCU 40, SCADA master 402, or other computing device based at least in part on one or more operating conditions received from one or more measurement devices associated with the wind turbine. In one aspect, preset values such as altitude of the wind turbine, turbulence intensity, and the like can also be used to determine the adjusted torque setpoint. The one or more measured operating conditions of a wind turbine can be received by the TCU 40, SCADA master 402, or other computing device from one or more measurement devices such as sensors 46, 48, 50, 52, 54 and/or 55 associated with a wind turbine 10, sensors (not shown) associated with a substation site 416, sensors associated with a meteorology site 418, and the like. In one non-limiting example, these measured operating conditions can include one or more of a system grid voltage, grid currents, grid phase angles (where the measured voltages, currents and phase angles can be used to calculate a system power factor), ambient temperature, and the like. Generally, the adjusted torque setpoint for the wind turbine 10 is set in the SCADA master 402, TCU 40, or other computing device. Generally, this torque rating is stored in one or more memory locations such as in memory 66 of the TCU 40, system memory 712 and/or mass storage 704 of the SCADA master 402 (see FIG. 7), and the like. This torque rating is used by the SCADA master 402, TCU 40, or other computing device to control the power output by the generator 26 of the wind turbine 10. At step 506, a real power output rating of the wind turbine can be adjusted based on the determined adjusted torque setpoint. For example, at the system grid voltage of 1.0 per unit or greater, the ambient temperature of about 40 Celsius, and a system power factor of between −0.90 up to and including about +0.90, the determined torque setpoint may be at its maximum for the wind turbine 10. Because real power output of the generator 26 of the wind turbine 10 is proportional to the torque, a maximum torque setpoint allows the machine to produce maximum power output thereby uprating the real power output of the wind turbine 10. For example, adjusting the real power output rating of the wind turbine based on the determined adjusted torque setpoint may comprise uprating an initial real power output rating of the wind turbine by about three percent or greater based on the determined adjusted torque setpoint at the system grid voltage of 1.0 per unit or greater, the ambient temperature of about 40 Celsius, and the system power factor is between −0.90 up to and including about +0.90. In one specific, non-limiting example, a wind turbine having an initial real power output rating of 1.62 MW may be uprated to 1.68 MW at the system grid voltage of 1.0 per unit or greater, the ambient temperature of about 40 Celsius, and the system power factor is between −0.90 up to and including about +0.90. Conversely, at other operating conditions, the determined torque setpoint may be adjusted downwardly thereby derating the power output of the wind turbine. For example, the wind turbine 10 may have an initial power rating of greater than about 1.60 MW and the derated power rating of the wind turbine is 1.60 MW or less when the system power factor is between −0.90 to and including about −0.95. In one specific, non-limiting example, a wind turbine having an initial real power output rating of about 1.60 MW may be uprated by about 0.10 percent or more (e.g., 1%, 5%, 10%, etc.) based on the determined adjusted torque setpoint when the system power factor is between −0.90 to and including about −0.95. Derating the real power output of the wind turbine can allow the generator 26 to produce more reactive power when the grid has a need for reactive power. This process allows the power output of the wind turbine 10 to be uprated or derated depending upon measured operating conditions by adjusting the torque setpoint of the wind turbine 10. The above-described process of FIG. 5 can occur continuously or intermittently to continually adjust the torque setting of the wind turbine 10 based on measured operating conditions, which results in adjusting the power output of the generator 26 of the wind turbine 10 based on the measured operating conditions. This can allow power output of the machine to be more closely aligned with actual measured operating conditions and less determined by average operating conditions. Such alignment, in some instances, may increase the power output by the wind turbine 10 without decreasing safety margins, thereby increasing annual energy production (AEP) of the wind turbine 10.

Figure 6:
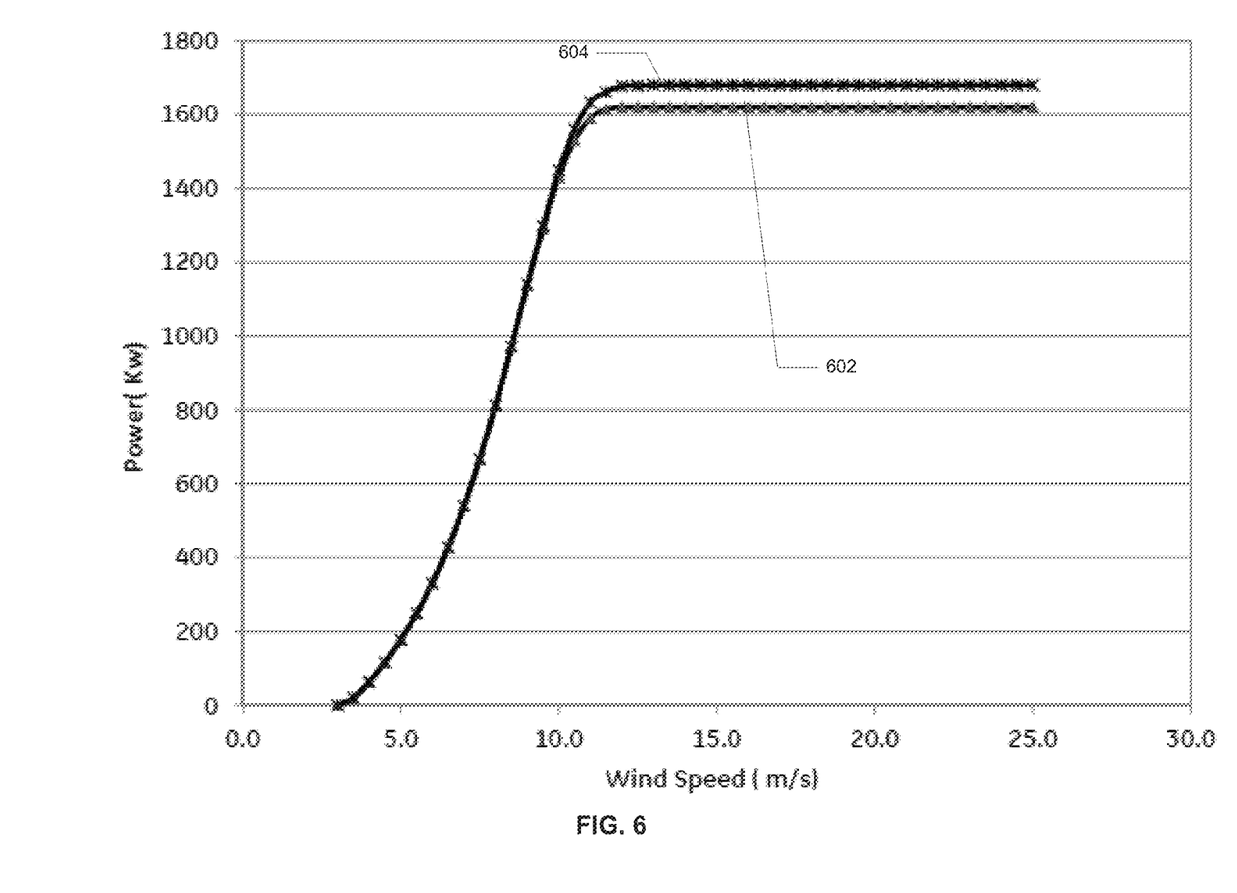
FIG. 6 is a non-limiting graphical example illustrating a power curve versus wind speed for an exemplary wind turbine.

Consider the following example. Shown in FIG. 6 is a power curve versus wind speed for an exemplary wind turbine. Though the exemplary wind turbine used to illustrate the data in FIG. 6 is a General Electric (GE) 1.6 MW-82.5 Meter wind turbine (as available from General Electric Company, Schenectady, N.Y.), it is to be appreciated that embodiments of the present invention are applicable to wind turbine manufactured by other entities and wind turbine having different ratings. The exemplary turbine has an exemplary rating of 1.6 MW. The first curve 602 illustrated using the triangular marks illustrates a maximum power output of about 1.62 MW with a Rho of 1.225, where Rho is the standard density expressed in $kg/m^3$, using conventional control of the wind turbine. The second curve 604, shown using asterisks, which incorporates an embodiment of the invention where the measured operating conditions are used to set the torque rating of the wind turbine, illustrates that power output can be increased from about 1.62 MW to about 1.68 MW with a Rho of 1.225. This increased power output can result in an increased AEP of about 2.08 percent given an average wind speed of about 8.5 m/s.

Figure 7:
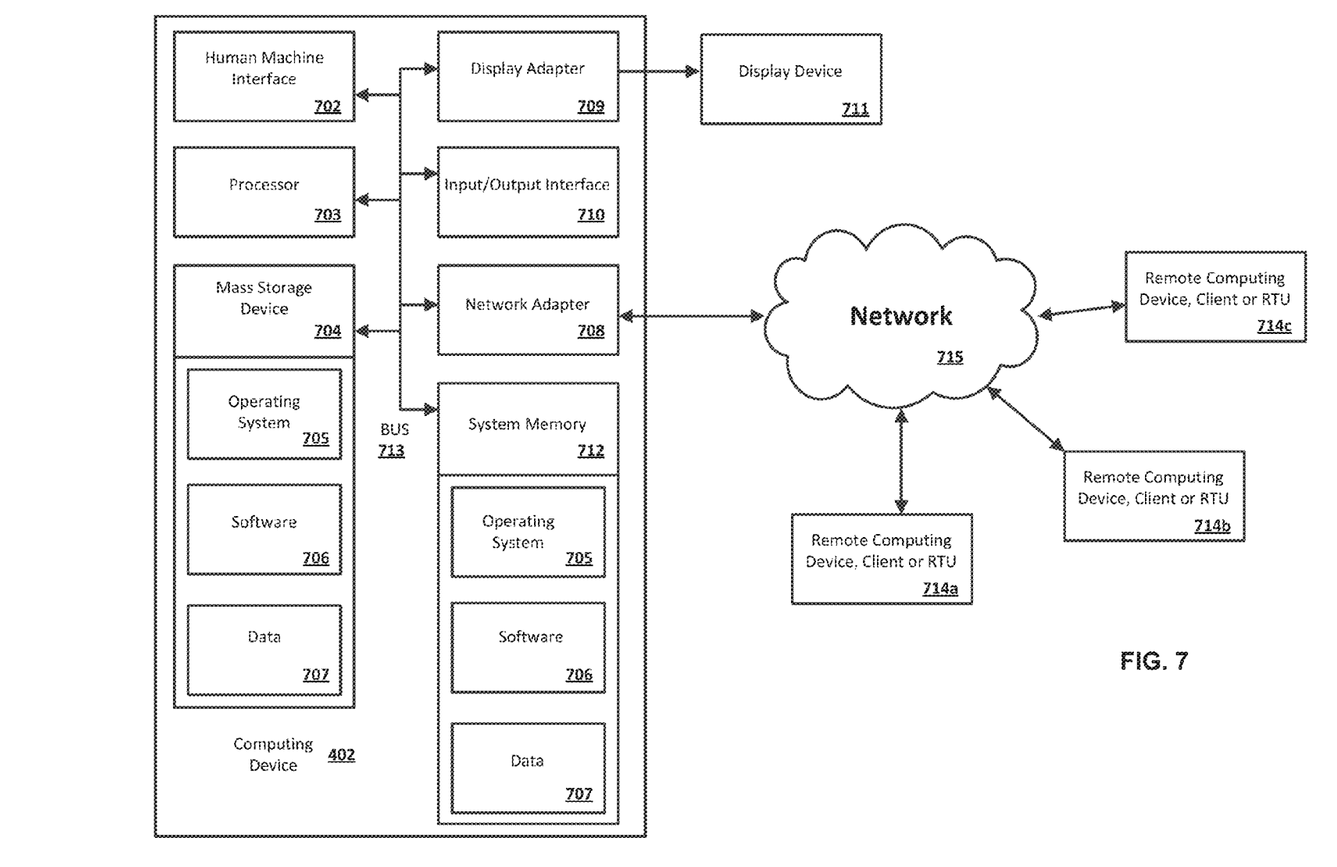
FIG. 7 is a block diagram illustrating an exemplary operating environment for performing the disclosed methods.

The above system has been described above as comprised of units. One skilled in the art will appreciate that this is a functional description and that software, hardware, or a combination of software and hardware can perform the respective functions. A unit can be software, hardware, or a combination of software and hardware. The units can comprise software 706 as illustrated in FIG. 7 and described below for determining a torque setpoint for a wind turbine based on operating conditions. In one exemplary aspect, the units can comprise a computing device such as the SCADA-master 402 as illustrated in FIG. 7 and described below.

FIG. 7 is a block diagram illustrating an exemplary operating environment for performing embodiments of the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, remote terminal units, smart meters, smart-grid components, distributed computing environments that comprise any of the above systems or devices, programmable logic controllers (PLCs) and the like.

Processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 402. The components of the computing device 402 can comprise, but are not limited to, one or more processors or processing units 703, a system memory 712, and a system bus 713 that couples various system components including the processor 703 to the system memory 712. In the case of multiple processing units 703, the system can utilize parallel computing. In one aspect, the one or more processors or processing units 703 can be configured to receive one or more measured operating conditions of a wind turbine from one or more measurement devices; determine an adjusted torque setpoint for the wind turbine based on the one or more received operating conditions; and adjust a real power output rating for the wind turbine based on the determined adjusted torque setpoint. In one aspect, the adjusted torque setpoint can be stored in one or more of the memory 704, 712 of the SCADA master 402, in the memory of an RTU 412, in the memory of a TCU 40, and the like.

The system bus 713 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 713, and all buses specified in this description can also be implemented over a wired or wireless network connection and each of the subsystems, including the processor 703, a mass storage device 704, an operating system 705, software 706, data 707, a network adapter 708, system memory 712, an Input/Output Interface 710, a display adapter 709, a display device 711, and a human machine interface 702, can be contained within one or more remote computing devices, clients or remote terminal units (RTUs) 714a,b,c at physically separate locations, connected through buses of this form, in effect implementing a fully distributed system or distributed architecture.

The computing device 402 typically comprises a variety of computer readable media. Exemplary readable media can be any available media that is non-transitory and accessible by the computing device 402 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data such as trigger point data 707 and/or program modules such as operating system 705 and software 706 that are immediately accessible to and/or are presently operated on by the processing unit 703.

In another aspect, the computing device 402 can also comprise other non-transitory, removable/non-removable, volatile/non-volatile computer storage media. By way of example, FIG. 7 illustrates a mass storage device 704 that can provide non-volatile storage of computer code, computer readable instructions, data structures, program modules, and other data for the computing device 402. For example, and not meant to be limiting, a mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, an operating system 705 and software 706. Each of the operating system 705 and software 706 (or some combination thereof) can comprise elements of the programming and the software 706. Data 707 can also be stored on the mass storage device 704. Data 707 can be stored in any of one or more databases known in the art Examples of such databases comprise, DB2® (IBM Corporation, Armonk, N.Y.), Microsoft® Access, Microsoft® SQL Server, (Microsoft Corporation, Bellevue, Wash.), Oracle®, (Oracle Corporation, Redwood Shores, Calif.), mySQL, PostgreSQL, and the like. The databases can be centralized or distributed across multiple systems.

In another aspect, the user can enter commands and information into the computing device 402 via an input device (not shown). Examples of such input devices comprise, but are not limited to, a keyboard, pointing device (e.g., a "mouse"), a microphone, a joystick, a scanner, tactile input devices such as gloves and other body coverings, and the like. These and other input devices can be connected to the processing unit 703 via a human machine interface 702 that is coupled to the system bus 713, but can be connected by other interface and bus structures, such as a parallel port, game port, an IEEE 1394 Port (also known as a Firewire port), a serial port, a universal serial bus (USB), and the like.

In yet another aspect, a display device 711 can also be connected to the system bus 713 via an interface, such as a display adapter 709. It is contemplated that the computing device 402 can have more than one display adapter 709 and the computing device 402 can have more than one display device 711. For example, a display device can be a monitor, an LCD (Liquid Crystal Display), a projector, and the like. In addition to the display device 711, other output peripheral devices can comprise components such as speakers (not shown) and a printer (not shown), which can be connected to the computing device 402 via Input/Output Interface 710. Any step and/or result of the methods can be output in any form to an output device. Such output can be any form of visual representation, including, but not limited to, textual, graphical, animation, audio, tactile, and the like.

The computing device 402 can operate in a networked environment using logical connections to one or more remote computing devices, clients or RTUs 714a,b,c. By way of example, a remote computing device 714 can be a personal computer, portable computer, a server, a router, a network computer, a smart meter, a vendor or manufacture's computing device, smart grid components, a peer device, an RTU, or other common network node, and so on. Logical connections between the computing device 402 and a remote computing device, client or RTU 714a,b,c can be made via a local area network (LAN) and a general wide area network (WAN). Such network connections can be through a network adapter 708. A network adapter 708 can be implemented in both wired and wireless environments. Such networking environments are conventional and commonplace in offices, enterprise-wide computer networks, intranets, and other networks 715.

For purposes of illustration, application programs and other executable program components such as the operating system 705 are illustrated herein as discrete blocks, although it is recognized that such programs and components reside at various times in different storage components of the computing device 402, and are executed by the data processor(s) of the computer. An implementation of the software 706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

As described above and as will be appreciated by one skilled in the art, embodiments of the present invention may be configured as a system, method, or computer program product. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable non-transitory computer-readable storage medium may be utilized including hard disks, CD-ROMs, optical storage devices, or magnetic storage devices.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as the one or more processors 703 discussed above with reference to FIG. 7, to produce a machine, such that the instructions which execute on the computer or other programmable data processing apparatus create a means for implementing the functions specified in the flowchart block or blocks.

These computer program instructions may also be stored in a non-transitory computer-readable memory that can direct a computer or other programmable data processing apparatus (e.g., one or more processors 703 of FIG. 7) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A control system for a wind turbine comprising:
one or more measurement devices configured to measure one or more operating conditions of a wind turbine;
a controller; and
a memory associated with the controller, wherein the controller performs one or more operations, the operations comprising:
receiving, via a sensor interface, the one or more measured operating conditions from the one or more measurement devices;
retrieving, via a processor, one or more preset values from the memory, wherein said one or more preset values includes an initial torque setpoint for the wind turbine;
determining, via the processor, an adjusted torque setpoint for the wind turbine based at least in part on one or more operating conditions received from one or more measurement devices associated with the wind turbine, wherein the adjusted torque setpoint is greater than zero; and
adjusting, via the processor, a real power output rating in the controller for the wind turbine based on the determined adjusted torque setpoint, wherein the adjusted real power output rating is greater than zero.

2. The system of claim 1, wherein the controller configured to determine an adjusted torque setpoint for the wind turbine based at least in part on one or more operating conditions received from one or more measurement devices associated with the wind turbine comprises receiving one or more of a system grid voltage, one or more grid currents, one or more grid phase angles and ambient temperature, wherein the controller calculates a system power factor from the received measured operating conditions.

3. The system of claim 2, wherein the controller configured to retrieve one or more preset values from the memory further comprises retrieving one or more of an altitude of the wind turbine and a turbulence density from the memory.

4. The system of claim 3, wherein the controller configured to adjust the real power output rating of the wind turbine based on the determined adjusted torque setpoint comprises uprating the real power output rating of the wind turbine based on the determined adjusted torque setpoint.

5. The system of claim 4, wherein the controller configured to adjust the real power output rating of the wind turbine based on the determined adjusted torque setpoint comprises uprating an initial real power output rating of the wind turbine by about three percent or greater based on the determined adjusted torque setpoint at the system grid voltage of 1.0 per unit or greater, the ambient temperature of about 40 Celsius, and the system power factor is between −0.90 up to and including about +0.90.

6. The system of claim 3, wherein the controller configured to adjust the real power output rating of the wind turbine based on the determined adjusted torque setpoint comprises derating the real power output rating of the wind turbine based on the determined adjusted torque setpoint.

7. The system of claim 6, wherein the controller configured to adjust the real power output rating of the wind turbine based on the determined adjusted torque setpoint comprises derating an initial real power output rating of the wind turbine by about 0.10 percent or greater based on the determined adjusted torque setpoint when the system power factor is between −0.90 to and including about −0.95.

8. The system of claim 1, wherein the controller configured to adjust the real power output rating of the wind turbine based on the determined adjusted torque setpoint comprises uprating an initial real power output rating of the wind turbine based on the determined adjusted torque setpoint.

9. The system of claim 1, wherein the controller configured to adjust the real power output rating of the wind turbine based on the determined adjusted torque setpoint comprises derating an initial real power output rating of the wind turbine based on the determined adjusted torque setpoint.

10. A control system for a wind turbine comprising:
one or more measurement devices configured to measure at least a system grid voltage, one or more grid currents, one or more grid phase angles, and an ambient temperature;
a controller; and
a memory associated with the controller, wherein the controller is configured to:
receiving, via a sensor interface, the system grid voltage, one or more grid currents, one or more grid phase angles, and ambient temperature from the one or more measurement devices;
calculate, via a processor, a system power factor from the received system grid voltage, one or more grid currents, one or more grid phase angles;
retrieving, via a processor, an initial torque setpoint, altitude of the wind turbine, and a turbulence intensity from the memory;
determining, via the processor, an adjusted torque setpoint for the wind turbine based on the system grid voltage, the system power factor, ambient temperature, altitude of the wind turbine, and the turbulence intensity, wherein the adjusted torque setpoint is greater than zero;
replacing, via the processor, the initial torque setpoint in the controller for the wind turbine with the determined adjusted torque setpoint; and
uprating or derating, via the processor, a power rating of the wind turbine based on the determined adjusted torque setpoint, wherein the uprated or derated power rating is greater than zero.

11. The system of claim 10, wherein the controller configured to uprate or derate the real power output rating of the wind turbine based on the determined adjusted torque setpoint comprises uprating an initial real power output rating of the wind turbine by about three percent or greater based on the determined adjusted torque setpoint at the system grid voltage of 1.0 per unit or greater, the ambient temperature of about 40 Celsius, and the system power factor is between −0.90 up to and including about +0.90.

12. The system of claim 10, wherein the controller configured to uprate or derate the real power output rating of the wind turbine based on the determined adjusted torque setpoint comprises derating an initial real power output rating of the wind turbine by about 0.10 percent or greater based on the determined adjusted torque setpoint when the system power factor is between −0.90 to and including about −0.95.

13. A method for controlling a power rating of a wind turbine comprising:
retrieving, by a computing device, one or more preset values from a memory, wherein said one or more preset values includes an initial torque setpoint for a wind turbine;

determining, by the computing device, an adjusted torque setpoint for the wind turbine based at least in part on one or more operating conditions received from one or more measurement devices associated with the wind turbine, wherein the adjusted torque setpoint is greater than zero; and adjusting a real power output rating of the wind turbine based on the determined adjusted torque setpoint, wherein the adjusted real power output is greater than zero.

14. The method of claim 13, wherein determining, by the computing device, an adjusted torque setpoint for the wind turbine based at least in part on one or more operating conditions received from one or more measurement devices associated with the wind turbine comprises receiving one or more of a system grid voltage, one or more grid currents, one or more grid phase angles and ambient temperature, wherein the computing device calculates a system power factor from the received measured operating conditions.

15. The method of claim 14, wherein retrieving, by the computing device, one or more preset values from a memory further comprises retrieving one or more of an altitude of the wind turbine and a turbulence density from the memory.

16. The method of claim 15, wherein adjusting the real power output rating of the wind turbine based on the determined adjusted torque setpoint comprises uprating the real power output rating of the wind turbine based on the determined adjusted torque setpoint.

17. The method of claim 16, wherein adjusting the real power output rating of the wind turbine based on the determined adjusted torque setpoint comprises uprating an initial real power output rating of the wind turbine by about three percent or greater based on the determined adjusted torque setpoint at the system grid voltage of 1.0 per unit or greater, the ambient temperature of about 40 Celsius, and the system power factor is between −0.90 up to and including about +0.90.

18. The method of claim 15, wherein adjusting the real power output rating of the wind turbine based on the determined adjusted torque setpoint comprises derating the real power output rating of the wind turbine based on the determined adjusted torque setpoint.

19. The method of claim 18, wherein adjusting the real power output rating of the wind turbine based on the determined adjusted torque setpoint comprises derating an initial real power output rating of the wind turbine by about 0.10 percent or greater based on the determined adjusted torque setpoint when the system power factor is between −0.90 to and including about −0.95.

20. The method of claim 13, wherein adjusting the real power output rating of the wind turbine based on the determined adjusted torque setpoint comprises uprating an initial real power output rating of the wind turbine based on the determined adjusted torque setpoint.

21. The method of claim 13, wherein adjusting the real power output rating of the wind turbine based on the determined adjusted torque setpoint comprises derating an initial real power output rating of the wind turbine based on the determined adjusted torque setpoint.

22. The method of claim 13, wherein the computing device comprises a controller for the wind turbine.

* * * * *